US012117759B2

(12) United States Patent
Sakamoto et al.

(10) Patent No.: US 12,117,759 B2
(45) Date of Patent: Oct. 15, 2024

(54) DEVICE WITH COVER AND IMAGE FORMING APPARATUS

(71) Applicant: FUJIFILM Business Innovation Corp., Tokyo (JP)

(72) Inventors: Toyohide Sakamoto, Kanagawa (JP); Takahiro Iizuka, Kanagawa (JP); Kazuya Tamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 171 days.

(21) Appl. No.: 17/902,889

(22) Filed: Sep. 4, 2022

(65) Prior Publication Data

US 2023/0305482 A1 Sep. 28, 2023

(30) Foreign Application Priority Data

Mar. 22, 2022 (JP) ................................ 2022-045785

(51) Int. Cl.
*G03G 21/16* (2006.01)
*B65H 1/26* (2006.01)

(52) U.S. Cl.
CPC .......... *G03G 21/1633* (2013.01); *B65H 1/26* (2013.01); *G03G 21/1647* (2013.01); *B65H 2402/441* (2013.01); *B65H 2402/45* (2013.01); *B65H 2601/321* (2013.01); *B65H 2801/06* (2013.01)

(58) Field of Classification Search
CPC ........... B65H 2402/31; B65H 2402/44; B65H 2402/441; B65H 2402/45; B65H 2601/321; G03G 21/1633; G03G 21/1647
See application file for complete search history.

(56) References Cited

U.S. PATENT DOCUMENTS

| | | | | |
|---|---|---|---|---|
| 2003/0118367 A1* | 6/2003 | Omata | G03G 21/1647 | 399/121 |
| 2007/0138193 A1 | 6/2007 | Aono et al. | | |
| 2008/0093789 A1* | 4/2008 | Lee | B65H 1/04 | 271/145 |
| 2014/0341611 A1* | 11/2014 | Asakawa | G03G 21/1638 | 399/124 |
| 2020/0133159 A1* | 4/2020 | Sato | B65H 5/06 | |
| 2021/0032055 A1* | 2/2021 | Uehara | B65H 1/04 | |

FOREIGN PATENT DOCUMENTS

| | | |
|---|---|---|
| JP | 2001199349 | 7/2001 |
| JP | 2006205780 | 8/2006 |
| JP | 2007160816 | 6/2007 |

* cited by examiner

*Primary Examiner* — Prasad V Gokhale
(74) *Attorney, Agent, or Firm* — JCIPRNET

(57) ABSTRACT

A device with a cover includes a cover that is provided at an apparatus body, an opening and closing cover that is provided at the apparatus body to be adjacent to the cover in a state where a gap with the cover is provided, that is opened and closed by rotating around a shaft portion arranged on an inside with respect to a portion of the opening and closing cover on a cover side, and that is adjacent to the cover on a shaft portion side, and an overhanging portion that is formed at an end portion of the opening and closing cover on the cover side and in which an end portion on the inside overhangs from an end portion on an outside to the cover side in a range of a rotation trajectory having a largest radius formed at the end portion on the cover side with the shaft portion as a rotation center.

15 Claims, 10 Drawing Sheets

DEVICE WITH COVER AND IMAGE FORMING APPARATUS

CROSS-REFERENCE TO RELATED APPLICATIONS

This application is based on and claims priority under 35 USC 119 from Japanese Patent Application No. 2022-045785 filed Mar. 22, 2022.

BACKGROUND

(i) Technical Field

The present invention relates to a device with a cover and an image forming apparatus.

(ii) Related Art

JP2006-205780A discloses a vehicle floor lifting apparatus including a movable floor that can be displaced to a developed state of being developed to close an opening of a vehicle floor formed above a fixed step for getting on and off, which is lower than the vehicle floor, and a stored state where the fixed step for getting on and off is stored to appear at a vehicle interior and a step cover that is provided to cover at least a part of each of opening edge portions surrounding the opening and side surfaces surrounding the fixed step for getting on and off. In the vehicle floor lifting apparatus, the movable floor is provided to be rotatable with respect to the vehicle floor with a rotary shaft of a hinge portion provided on one end side as a rotation center and has a shape having a part moving on a curved surface-shaped trajectory in an operating state where an end portion facing the opening edge portion in a case of the developed state transitions to the developed state or the stored state, and in the step cover, a part covering the side surfaces surrounding the fixed step for getting on and off is formed in a curved surface-shape to keep a gap with the part moving on the curved surface-shape trajectory in the operating state substantially constant.

JP2001-199349A discloses a mating portion structure between a steering wheel and a column cover, in which a mating surface between a lower cover covering a vehicle front side of the steering wheel and the column cover covering a steering wheel side of a steering column is formed in a conical surface shape curved in the same direction. In the mating portion structure, the lower cover of the steering wheel and the mating surface of the column cover are arranged to be parallel to each other with a constant gap.

JP2007-160816A discloses a cover opening and closing mechanism that is openable and closable with respect to a body and that includes a link structure which is rotatably supported by the body in a range of a first predetermined angle from a closed state of the cover and which rotatably supports the cover in a range of a second predetermined angle. In the cover opening and closing mechanism, the link structure rotates integrally with the cover in a case of rotating in the range of the first predetermined angle, and only the cover rotates in the range of the second predetermined angle in a state where the link structure has rotated by the first predetermined angle from the closed state of the cover.

SUMMARY

As the device with a cover, a device with a cover including a cover that is provided at an apparatus body and an opening and closing cover that is provided at the apparatus body to be adjacent to the cover in a state of having a gap with the cover and is opened and closed by rotating around a shaft portion is conceivable.

In the device with a cover, the number of components increases in a case where a gap is decreased by adding a component such as a rubber member and a seal member.

Aspects of non-limiting embodiments of the present disclosure relate to a device with a cover and an image forming apparatus that decrease a gap while suppressing an increase in the number of components compared to a case where a gap is decreased by adding a component.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a device with a cover including a cover that is provided at an apparatus body, an opening and closing cover that is provided at the apparatus body to be adjacent to the cover in a state where a gap with the cover is provided and that is opened and closed by rotating around a shaft portion arranged on an inside with respect to a portion of the opening and closing cover on a cover side, and an overhanging portion that is formed at an end portion of the opening and closing cover on the cover side and in which an end portion on the inside overhangs from an end portion on an outside to the cover side in a range of a rotation trajectory having a largest radius formed at the end portion on the cover side with the shaft portion as a rotation center.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment according to the present invention will be described based on the drawings.

First Exemplary Embodiment

Image Forming Apparatus 10

Figure 1:
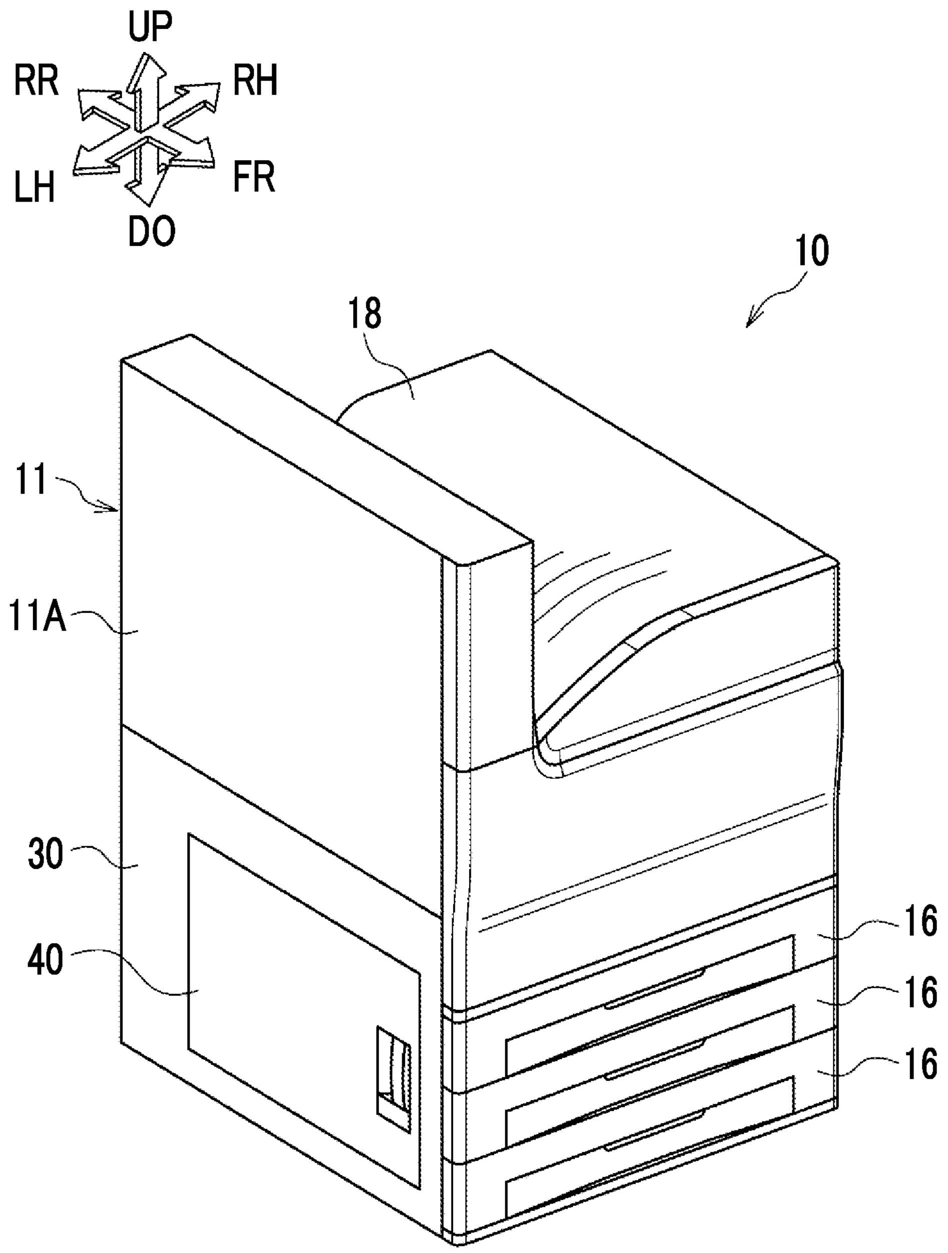
FIG. 1 is a perspective view showing an image forming apparatus according to a first exemplary embodiment.
Figure 2:
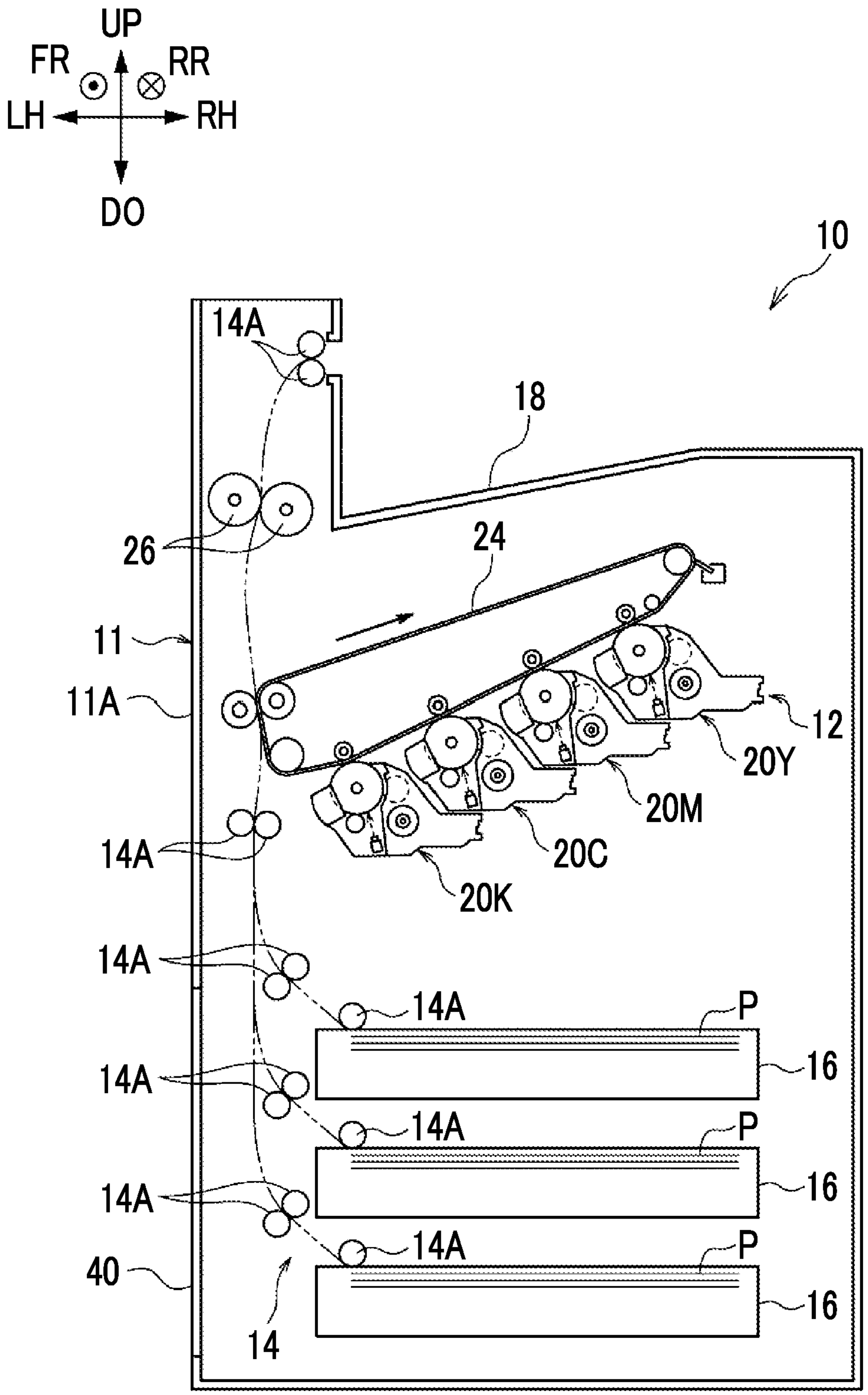
FIG. 2 is a front cross-sectional view showing the image forming apparatus according to the first exemplary embodiment.

An image forming apparatus 10 according to the present exemplary embodiment will be described. FIG. 1 is a perspective view showing the image forming apparatus 10. FIG. 2 is a front cross-sectional view showing the image forming apparatus 10.

An arrow UP shown in the drawings indicates an upward direction of the apparatus (specifically, a vertically upward direction), and an arrow DO indicates a downward direction of the apparatus (specifically, a vertically downward direction). In addition, an arrow LH in the drawings indicates a leftward direction of the apparatus, and an arrow RH indicates a rightward direction of the apparatus. In addition, an arrow FR in the drawings indicates a forward direction of the apparatus, and an arrow RR indicates a rearward direction of the apparatus. Since the directions are directions determined for convenience of description, an apparatus configuration is not limited to the directions. The term "apparatus" in each direction of the apparatus is omitted in some cases. That is, for example, the "upward direction of the apparatus" is simply referred to as the "upward direction" in some cases.

In addition, in the following description, an "up-down direction" is used to mean "both of the upward direction and the downward direction" or "any one of the upward direction or the downward direction" in some cases. A "right-left direction" is used to mean "both of the rightward direction and the leftward direction" or "any one of the rightward direction or the leftward direction" in some cases. The "right-left direction" can also be referred to as sideways, a lateral direction, and a horizontal direction. A "front-rear direction" is used to mean "both of the forward direction and the rearward direction" or "any one of the forward direction or the rearward direction" in some cases. The "front-rear direction" can also be referred to as sideways, a lateral direction, and a horizontal direction. In addition, the up-down direction, the right-left direction, and the front-rear direction are directions intersecting each other (specifically, directions orthogonal to each other).

In addition, a symbol in which "x" is written in "○" in the drawings means an arrow from the front toward the back of the page. In addition, a symbol in which "•" is written in "○" in the drawings means an arrow from the back toward the front of the page.

The image forming apparatus 10 shown in FIGS. 1 and 2 is an example of a device with a cover and is an apparatus that forms an image. Specifically, as shown in FIGS. 1 and 2, the image forming apparatus 10 includes an image forming apparatus body 11, a transport unit 14, an image forming unit 12, a cover 30, an opening and closing cover 40, a frame 92, a transport member 14A, an overhanging portion 60, and an overhanging portion 50. Hereinafter, each unit of the image forming apparatus 10 will be described.

Image Forming Apparatus Body 11

The image forming apparatus body 11 shown in FIGS. 1 and 2 is an example of an apparatus body and is a portion where each configuration unit of the image forming apparatus 10 is provided. As shown in FIGS. 1 and 2, the image forming apparatus body 11 forms a substantially rectangular parallelepiped shape with the cover 30 and the opening and closing cover 40. Specifically, the image forming apparatus body 11 has a housing 11A that accommodates each configuration unit of the image forming apparatus 10.

Transport Unit 14 and Image Forming Unit 12

The transport unit 14 shown in FIG. 2 transports a recording medium P such as paper accommodated in an accommodating portion 16 to a discharge portion 18. Specifically, as shown in FIG. 2, the transport unit 14 has the transport member 14A such as a plurality of transport rollers, and the transport member 14A transports the recording medium P. The recording medium P is an example of a medium.

The image forming unit 12 shown in FIG. 2 forms an image on the recording medium P transported by the transport unit 14 (specifically, the transport member 14A). Specifically, the image forming unit 12 forms a toner image (an example of an image) on the recording medium P through an electrophotographic method. More specifically, as shown in FIG. 2, the image forming unit 12 has toner image forming units 20Y, 20M, 20C, and 20K (hereinafter, referred to as 20Y to 20K), a transfer body 24, and a fixing unit 26.

Each of the toner image forming units 20Y to 20K of the image forming unit 12 performs each step of charging, exposing, developing, and transferring and forms a toner image of each of colors including yellow (Y), magenta (M), cyan (C), and black (K) on the transfer body 24. Further, the image forming unit 12 transfers the toner image of each color formed on the transfer body 24 to the recording medium P, and the toner image is fixed to the recording medium P by the fixing unit 26. In this manner, an intermediate transfer method in which the image forming unit 12 transfers the image to the recording medium P via the transfer body 24 is used.

Cover 30

Figure 3:
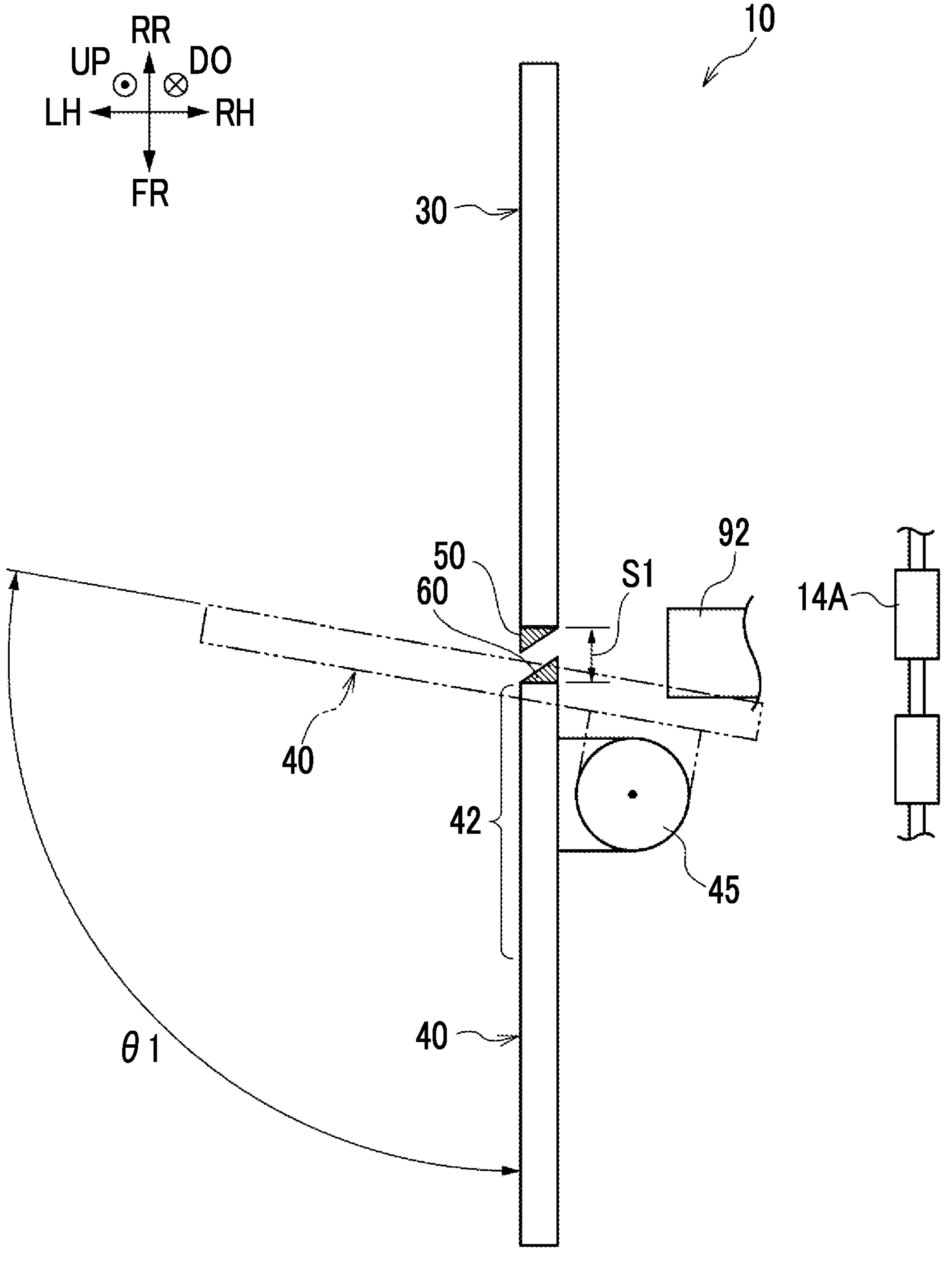
FIG. 3 is a plan cross-sectional view showing a cover, an opening and closing cover, and an overhanging portion according to the first exemplary embodiment.

The cover 30 shown in FIGS. 1 and 3 is a cover provided at the image forming apparatus body 11. Specifically, the cover 30 is an exterior cover of the image forming apparatus 10 and covers the configuration units provided inside the image forming apparatus body 11. The cover 30 may be a cover that does not rotate with respect to the image forming apparatus body 11 or may be a cover that has a rotating shaft and can be opened and closed by rotating with respect to the image forming apparatus body 11.

For example, the cover 30 having the rotating shaft can be configured to be opened and closed by rotating around the rotating shaft arranged on an inside with respect to a portion on an opposite side (specifically, a rear side) to the opening and closing cover 40 along the up-down direction. Further, for example, the cover 30 may be configured to be opened and closed by rotating around the rotating shaft arranged on an inside with respect to an upper portion or a lower portion along the front-rear direction. The position of the rotating shaft of the cover 30 can be arranged at any position insofar as the cover 30 and the opening and closing cover 40 can be opened and closed without interfering with each other.

In the present exemplary embodiment, the cover 30 is configured by, for example, a resin material. As shown in FIG. 3, the cover 30 is formed in a plate shape having the right-left direction as a thickness direction.

Opening and Closing Cover 40

As shown in FIG. 3, the opening and closing cover 40 is provided at the image forming apparatus body 11 (see FIG. 1) to be adjacent to the cover 30 in a state of having a gap S1 with the cover 30. Specifically, the opening and closing cover 40 is adjacent to the cover 30 on a front side of the cover 30. In a case where the cover 30 has the rotating shaft on the inside with respect to the portion on the opposite side (specifically, the rear side) to the opening and closing cover 40, the opening and closing cover 40 is adjacent to an opposite side to a rotating shaft side of the cover 30.

The opening and closing cover 40 is opened and closed by rotating around a shaft portion 45 arranged on an inside with respect to a portion 42 (hereinafter, referred to as the rear portion 42) on a cover 30 side (specifically, the rear side). That is, the opening and closing cover 40 is opened and closed as a front portion moves with the rear portion 42 as a rotation center (that is, a fulcrum). Specifically, the opening and closing cover 40 rotates around the rotating shaft along the up-down direction between an open position (a position shown by a two-dot chain line in FIG. 3) and a closed position (a position shown by a solid line in FIG. 3) in a range of an angle ƒ1 shown in FIG. 3.

The inside with respect to the opening and closing cover 40 is an internal side of the image forming apparatus body 11 with respect to the opening and closing cover 40 and is a right side in the present exemplary embodiment. An outside with respect to the opening and closing cover 40 is an opposite side to the inside with respect to the opening and closing cover 40 and is a left side in the present exemplary embodiment.

In addition, the rear portion 42 is a portion of the opening and closing cover 40 on a base end side (that is, a rotation center side) and is a portion becoming the inside of the opening and closing cover 40 in an opened state (a state shown by a two-dot chain line in FIG. 3) of the opening and closing cover 40. In addition, the opening and closing cover 40 is adjacent to the cover 30 at the rear portion 42 in which the shaft portion 45 is arranged. In other words, the opening and closing cover 40 is adjacent to the cover 30 on a shaft portion 45 side.

The opening and closing cover 40 is configured by the same material (for example, a resin material) as the cover 30. As shown in FIG. 3, the opening and closing cover 40 is formed in a plate shape having the right-left direction as a thickness direction, like the cover 30. The opening and closing cover 40 and the cover 30 have, for example, the same thickness.

Frame 92 and Transport Member 14A

The frame 92 shown in FIG. 3 is an example of a component and functions as a support body that supports the configuration units arranged inside the image forming apparatus body 11 (see FIG. 2). As shown in FIG. 3, the frame 92 is arranged at a position that is visible through the gap S1 in the image forming apparatus body 11. In other words, at least a part of the frame 92 directly faces the gap S1 without going through another member with the gap S1. Specifically, the frame 92 faces the gap S1 in the right-left direction (that is, the thickness direction of the cover 30 and the opening and closing cover 40).

FIG. 3 shows a part of the frame 92. The frame 92 is formed of a material different from the material for the opening and closing cover 40 and the cover 30. Specifically, the frame 92 is configured by, for example, a metal material.

As shown in FIG. 3, the transport member 14A is arranged at a position facing the gap S1 (hereinafter, referred to as a facing position) in the image forming apparatus body 11. Specifically, the transport member 14A faces the gap S1 in the right-left direction (that is, the thickness direction of the cover 30 and the opening and closing cover 40). Another member may be arranged between the transport member 14A and the gap S1. Therefore, the facing position includes a position where the transport member 14A faces the gap S1 via another member.

The transport member 14A is not limited to the transport roller, and a transport belt and other transport members may be used. FIG. 3 shows an example in which the transport roller is used as the transport member 14A. In addition, FIG. 3 shows a part of the transport member 14A.

Overhanging Portion 60

Figure 4:
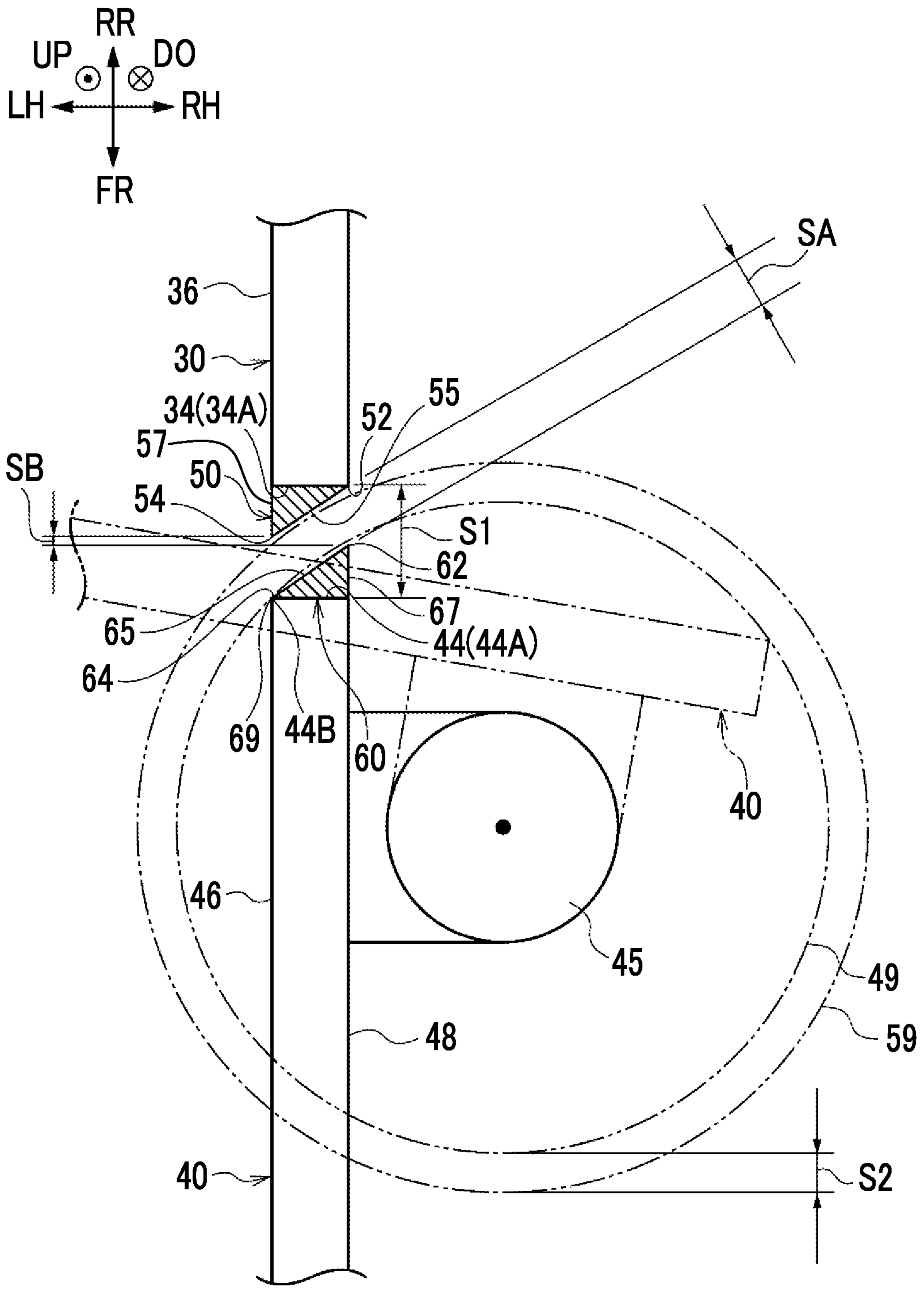
FIG. 4 is an enlarged plan cross-sectional view showing a part of the cover, the opening and closing cover, and the overhanging portion according to the first exemplary embodiment.

As shown in FIG. 4, the overhanging portion 60 is formed at an end portion (hereinafter, referred to as a rear end portion 44) of the opening and closing cover 40 on the cover 30 side (specifically, the rear side). The rear end portion 44 has an end surface 44A facing the cover 30 side (specifically, the rear side).

In the overhanging portion 60, an end portion 62 on the inside (hereinafter, referred to as the inner end portion 62) overhangs from an end portion 64 on the outside (hereinafter, referred to as the outer end portion 64) to the cover 30 side (specifically, the rear side) in a range of a rotation trajectory 49 having the largest radius formed at the rear end portion 44 with the shaft portion 45 as a rotation center.

The rotation trajectory 49 having the largest radius is a rotation trajectory formed by an end 44B on the outermost side of the rear end portion 44 of the opening and closing cover 40. In addition, the inside with respect to the overhanging portion 60 is an internal side of the image forming apparatus body 11 with respect to the overhanging portion 60 and is the right side in the present exemplary embodiment. The outside with respect to the overhanging portion 60 is an opposite side to the inside with respect to the overhanging portion 60 and is the left side in the present exemplary embodiment.

In the present exemplary embodiment, the overhanging portion 60 is provided between an end surface 34A of the cover 30 and the end surface 44A of and the opening and closing cover 40 (that is, the gap S1) and is arranged at a position facing the frame 92 as shown in FIG. 3. Further, the overhanging portion 60 is arranged at a position facing the transport member 14A. Specifically, the overhanging portion 60 faces the frame 92 and the transport member 14A in the right-left direction (that is, the thickness direction of the cover 30 and the opening and closing cover 40).

As shown in FIG. 4, the overhanging portion 60 has an inclined surface 65 that is inclined with respect to a surface 46 (that is, an outer surface) of the opening and closing cover 40 along the rotation trajectory 49. The inclined surface 65 is a surface formed from the inner end portion 62 to the outer end portion 64 and is a surface facing an obliquely left rear side. The inclined surface 65 is also called an inclined surface along a tangent line tangent to a circle formed by the rotation trajectory 49.

In addition, the overhanging portion 60 has an inner surface 67 arranged on an identical surface to an inner surface 48 (that is, a surface on the inside) of the opening and closing cover 40. Further, the overhanging portion 60 is formed in a substantially triangular shape in plan cross-sectional view. Specifically, the overhanging portion 60 is formed in a substantially right-angled triangular shape having the inclined surface 65 as the hypotenuse and the inner surface 67 as the short side in plan cross-sectional view. The dimension of the overhanging portion 60 in the right-left direction is the same as the dimension of the opening and closing cover 40 in the right-left direction.

Figure 5:
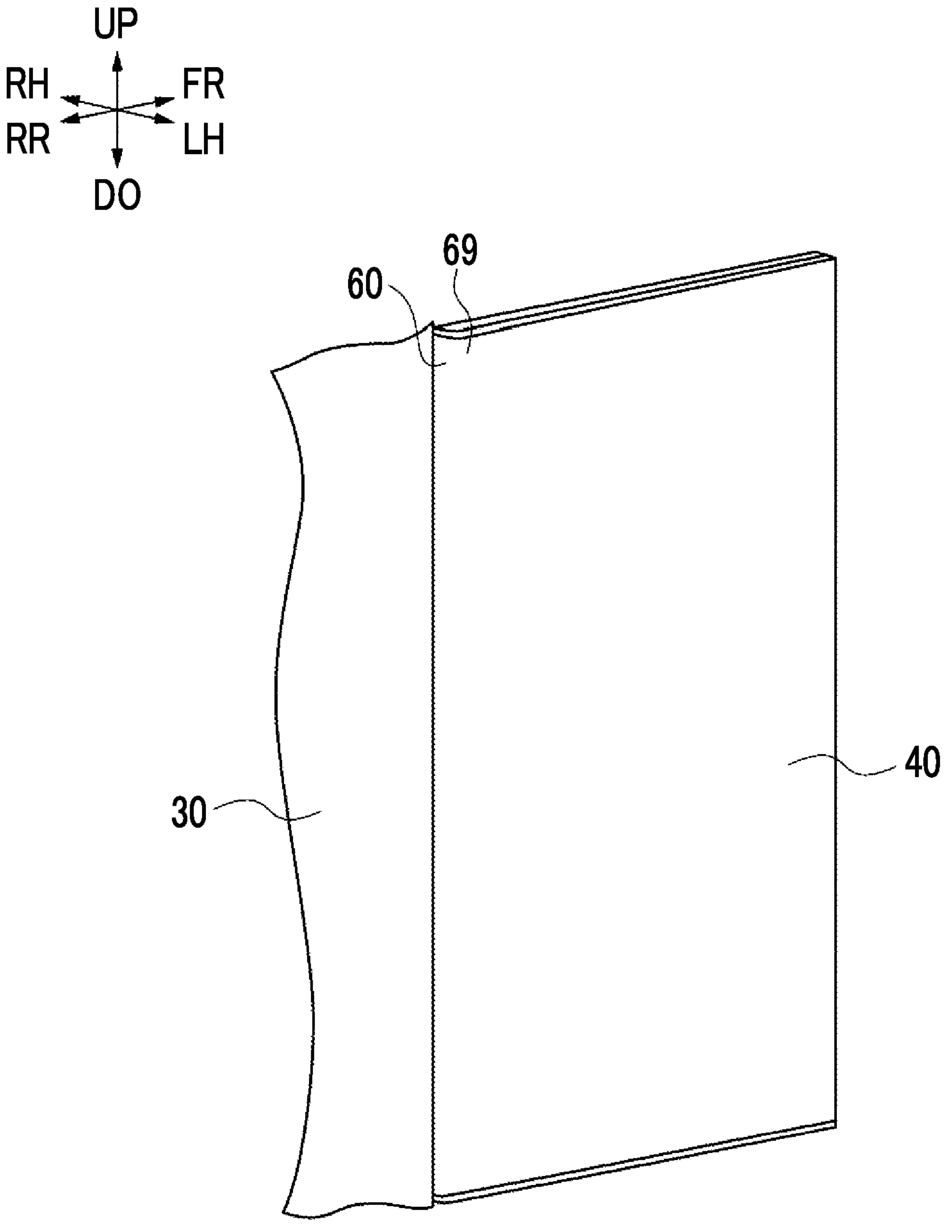
FIG. 5 is a perspective view showing the opening and closing cover according to the first exemplary embodiment.

As shown in FIG. 5, a boundary 69 between the overhanging portion 60 and the opening and closing cover 40 is formed in an arc shape in a case of being viewed in an axial direction of the shaft portion 45 (specifically, the up-down direction). That is, the boundary 69 is formed by a curved surface that does not have a corner (edge).

Overhanging Portion 50

As shown in FIG. 4, the overhanging portion 50 is formed at an end portion (hereinafter, referred to as a front end portion 34) of the cover 30 on an opening and closing cover 40 side (specifically, the front side). The front end portion 34 has the end surface 34A facing the opening and closing cover 40 side (specifically, the front side).

The overhanging portion 50 overhangs to the opening and closing cover 40 side (specifically, the front side) outside a range of an imaginary circle 59 that is formed to have a gap S2 determined in advance with respect to the rotation trajectory 49 and that has a diameter larger than the diameter of the rotation trajectory 49. Specifically, in the overhanging portion 50, an end portion 54 on the outside (hereinafter, referred to as the outer end portion 54) overhangs from an end portion 52 on the inside (hereinafter, referred to as an inner end portion 52) to the opening and closing cover 40 side (specifically, the front side).

The inside with respect to the overhanging portion 50 is an internal side of the image forming apparatus body 11 with respect to the overhanging portion 50 and is the right side in the present exemplary embodiment. The outside with respect to the overhanging portion 50 is an opposite side to the inside with respect to the overhanging portion 50 and is the left side in the present exemplary embodiment.

In the present exemplary embodiment, the overhanging portion 50 is provided between the end surface 34A of the cover 30 and the end surface 44A of and the opening and closing cover 40 (that is, the gap S1) and is arranged at a position facing the frame 92 as shown in FIG. 3. Further, the overhanging portion 50 is arranged at a position facing the transport member 14A. Specifically, the overhanging portion 50 faces the frame 92 and the transport member 14A in the right-left direction (that is, the thickness direction of the cover 30 and the opening and closing cover 40).

As shown in FIG. 4, the overhanging portion 50 has an inclined surface 55 that is inclined with respect to a surface 36 (that is, an outer surface) of the cover 30 along the imaginary circle 59. The inclined surface 55 is a surface formed from the inner end portion 52 to the outer end portion 54 and is a surface facing an obliquely right front side. In addition, the inclined surface 55 faces the inclined surface 65. The inclined surface 55 is also called an inclined surface along a tangent line tangent to the imaginary circle 59.

In addition, the overhanging portion 50 has an outer surface 57 arranged on an identical surface to the surface 36 (that is, an outer surface) of the cover 30. Further, the overhanging portion 50 is formed in a substantially triangular shape in plan cross-sectional view. Specifically, the overhanging portion 50 is formed in a substantially right-angled triangular shape having the inclined surface 55 as the hypotenuse and the outer surface 57 as the short side in plan cross-sectional view. The dimension of the overhanging portion 50 in the right-left direction is the same as the dimension of the cover 30 in the right-left direction.

Workings According to Present Exemplary Embodiment

In the present exemplary embodiment, as shown in FIG. 4, in the overhanging portion 60, the inner end portion 62 overhangs from the outer end portion 64 to the cover 30 side (specifically, the rear side) in the range of the rotation trajectory 49 having the largest radius formed at the rear end portion 44 with the shaft portion 45 as the rotation center.

Figure 6:
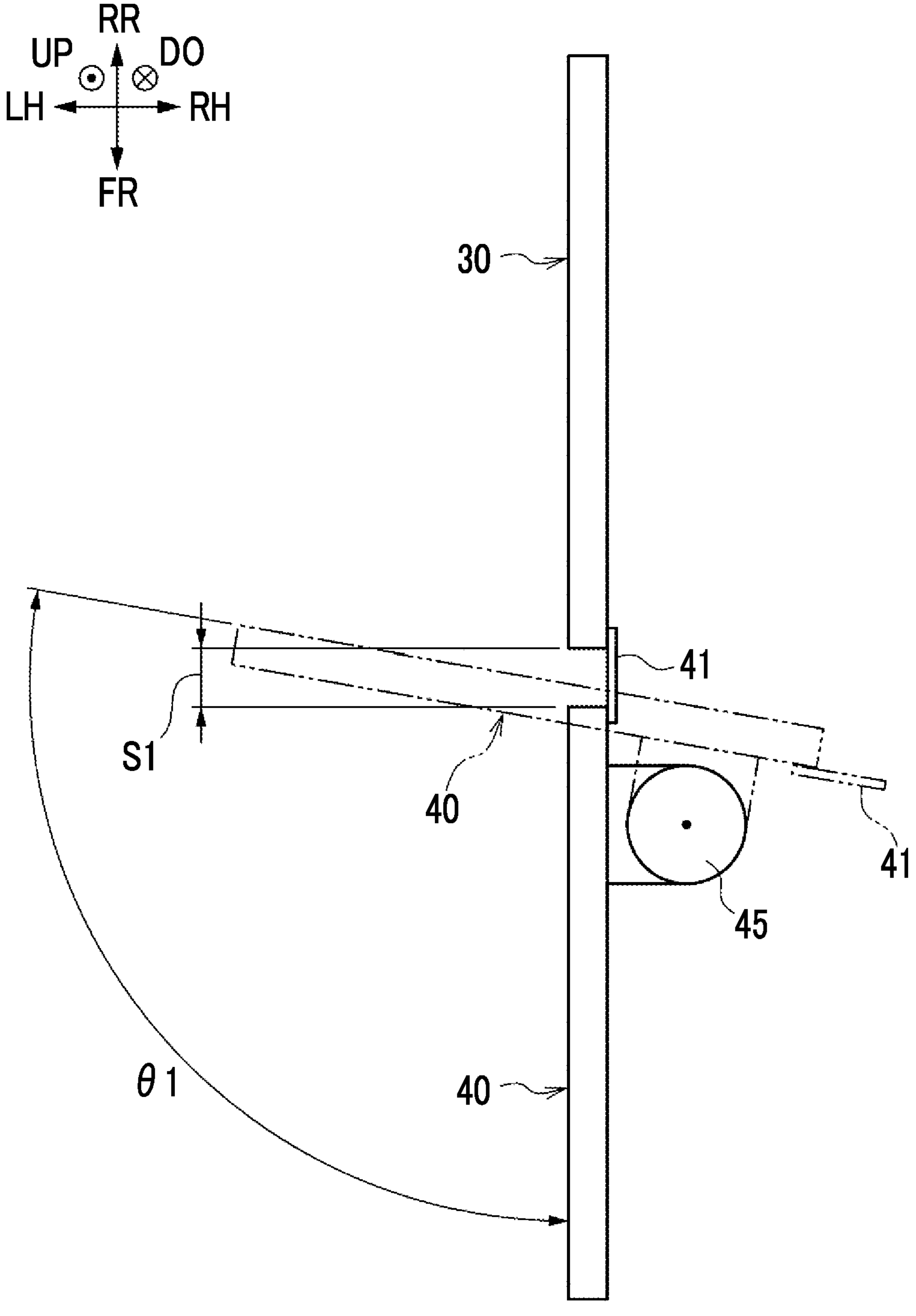
FIG. 6 is a plan cross-sectional view showing a cover and an opening and closing cover according to a comparative embodiment.

Herein, as shown in FIG. 6, in a case where the gap S1 between the opening and closing cover 40 and the cover 30 is decreased by adding a component 41 (hereinafter, referred to as a form A), the number of components increases, leading to an increase in costs.

On the contrary, in the present exemplary embodiment, as described above, in the overhanging portion 60, the inner end portion 62 overhangs from the outer end portion 64 to the cover 30 side (specifically, the rear side) in the range of the rotation trajectory 49.

Specifically, as shown in FIG. 4, in the present exemplary embodiment, a gap SA between the overhanging portion 60 and the overhanging portion 50 in a direction perpendicular to the inclined surface 55 is smaller than the gap S1, and a gap SB between the overhanging portion 60 and the overhanging portion 50 along the front-rear direction is further smaller than the gap SA.

In addition, in the present exemplary embodiment, the overhanging portion 60 has the inclined surface 65 that is inclined with respect to the surface 46 (that is, the outer surface) of the opening and closing cover 40 along the rotation trajectory 49.

In addition, in the present exemplary embodiment, as shown in FIG. 5, the boundary 69 between the overhanging portion 60 and the opening and closing cover 40 is formed in an arc shape in a case of being viewed in the axial direction of the shaft portion 45 (specifically, the up-down direction).

Figure 7:
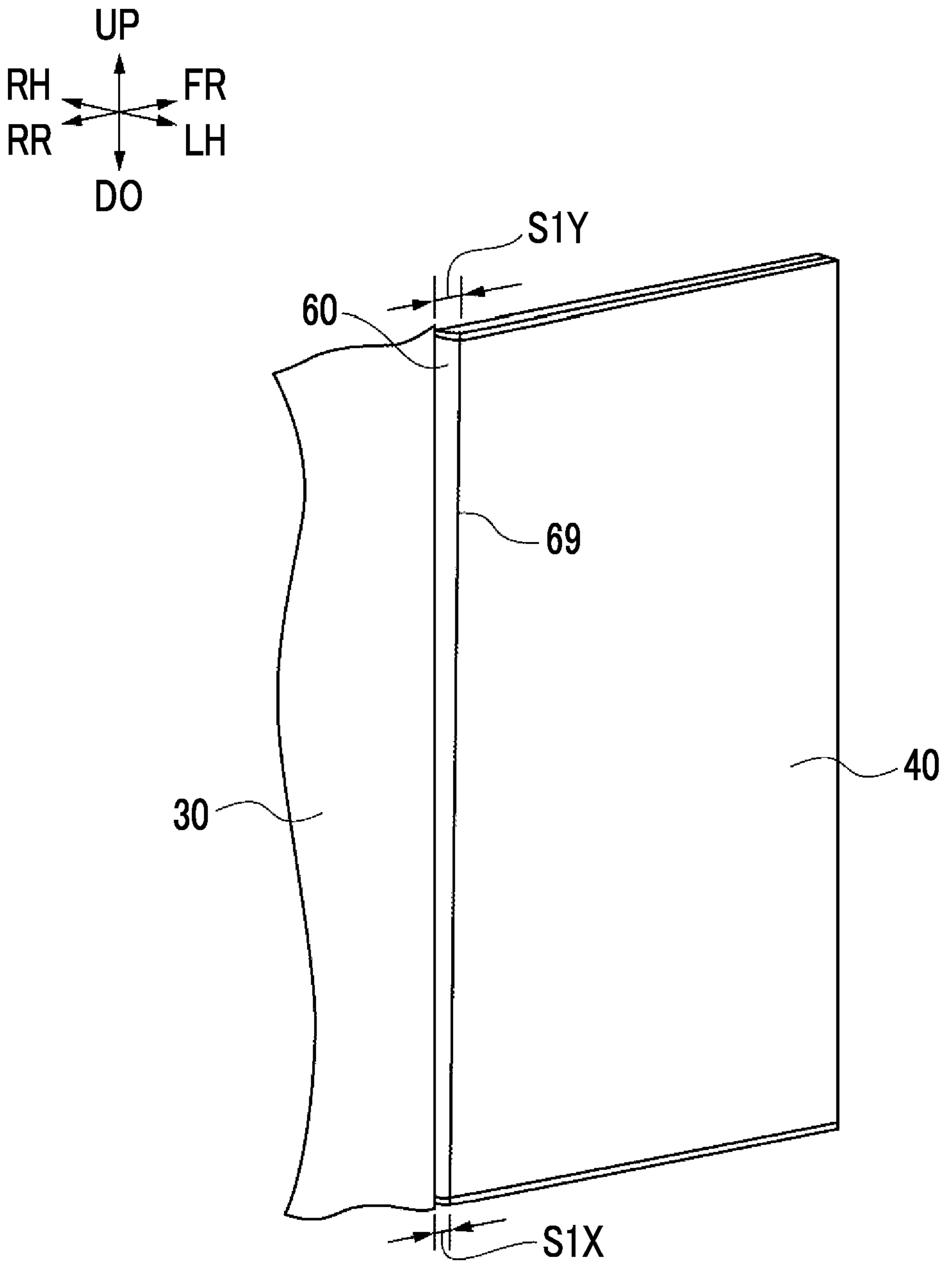
FIG. 7 is a perspective view showing an opening and closing cover according to another comparative embodiment.

Herein, as shown in FIG. 7, in a case where the boundary 69 between the overhanging portion 60 and the opening and closing cover 40 is formed in a square shape in a case of being viewed in the axial direction of the shaft portion 45 (specifically, the up-down direction) (hereinafter, referred to as a form B), for example, a gap S1Y on an upper side between the cover 30 and the opening and closing cover 40 is larger than a gap SIX on a lower side as the opening and closing cover 40 is inclined to an obliquely lower front side. In this case, since the gap S1Y and the gap SIX with the cover 30 are understood with the square-shaped boundary 69 as reference, variations in the width of the gap S1 are noticeable.

On the contrary, in the present exemplary embodiment, as described above, the boundary 69 between the overhanging portion 60 and the opening and closing cover 40 is formed in an arc shape in a case of being viewed in the axial direction of the shaft portion 45 (specifically, the up-down direction) as shown in FIG. 5, the boundary 69 is unlikely to be recognized compared to the form B.

In addition, in the present exemplary embodiment, the overhanging portion 50 overhangs to the opening and closing cover 40 side (specifically, the front side) outside the range of the imaginary circle 59 that is formed to have the gap S2 determined in advance with respect to the rotation trajectory 49 and that has a diameter larger than the diameter of the rotation trajectory 49.

In addition, in the present exemplary embodiment, the overhanging portion 50 has the inclined surface 55 that is inclined with respect to the surface 36 (that is, the outer surface) of the cover 30 along the imaginary circle 59.

In the present exemplary embodiment, the overhanging portion 50 and the overhanging portion 60 are arranged at positions facing the frame 92 arranged at a position visible through the gap S1 in the image forming apparatus body 11.

Herein, in a case where the overhanging portion 50 and the overhanging portion 60 are arranged at positions shifted away with respect to the frame 92 (hereinafter, referred to as a form C), the frame 92 is likely to be visible through the gap S1. In particular, since the frame 92 is formed of the material for the opening and closing cover 40 and the cover 30, contrast is generated, and the frame 92 is likely to be noticeable.

On the contrary, in the present exemplary embodiment, as described above, the overhanging portion 50 and the overhanging portion 60 are arranged at the positions facing the frame 92.

In addition, in the present exemplary embodiment, the overhanging portion 50 and the overhanging portion 60 are arranged at positions facing the transport member 14A arranged at a facing position facing the gap S1 in the image forming apparatus body 11.

Herein, in a case where the overhanging portion 50 and the overhanging portion 60 are arranged at positions shifted away with respect to the transport member 14A (hereinafter, referred to as a form D), noise generated by transporting the recording medium P with the transport member 14A is likely to leak from the gap S1.

On the contrary, in the present exemplary embodiment, as described above, the overhanging portion 50 and the overhanging portion 60 are arranged at the positions facing the transport member 14A.

In addition to noise generated by transporting the recording medium P with the transport member 14A as the noise, a sound source that generates sound, such as a motor, a fan, a solenoid, and an electromagnetic clutch, is a cause of noise. Therefore, in a case where the sound source is arranged at a facing position facing the gap S1 in the image forming apparatus body 11, for example, it is desirable that the overhanging portion 50 and the overhanging portion 60 are arranged at positions facing the sound source.

Modification Example of Present Exemplary Embodiment

Although the opening and closing cover 40 is opened and closed as a front portion moves with the rear portion 42 as the rotation center (that is, the fulcrum) in the present exemplary embodiment, the invention is not limited thereto. For example, the opening and closing cover 40 may be configured to be opened and closed as the rear portion 42 moves with the front portion as a rotation center (that is, a fulcrum).

In addition, although the opening and closing cover 40 rotates around the rotating shaft along the up-down direction in the present exemplary embodiment, the invention is not limited thereto. For example, the opening and closing cover 40 may be configured to rotate around a rotating shaft along the front-rear direction or the right-left direction.

In addition, although the overhanging portion 50 and the overhanging portion 60 are formed in a substantially right-angled triangular shape in plan cross-sectional view in the present exemplary embodiment, the invention is not limited thereto. For example, the overhanging portion 50 and the overhanging portion 60 may have a triangular shape other than a right-angled triangular shape, such as a substantially isosceles triangle, and a polygonal shape other than a triangular shape, such as a quadrangular shape (for example, a trapezoidal shape), in plan cross-sectional view, and can be formed in various shapes.

In addition, although the overhanging portion 60 has the inclined surface 65 that is inclined with respect to the surface 46 (that is, the outer surface) of the opening and closing cover 40 along the rotation trajectory 49 in the present exemplary embodiment, the invention is not limited thereto. For example, the overhanging portion 60 may have the orthogonal surface orthogonal to the surface 46 of the opening and closing cover 40. As this configuration, a configuration where the overhanging portion 60 overhangs in a stepped manner from the outer end portion 64 to the inner end portion 62 is conceivable.

In addition, although the inner surface 67 of the overhanging portion 60 is arranged on the identical surface with respect to the inner surface 48 of the opening and closing cover 40 in the present exemplary embodiment, the invention is not limited thereto. For example, the overhanging portion 60 may be configured to overhang to the inside (that is, the right side) with respect to the inner surface 48 of the opening and closing cover 40. In this case, the dimension of the overhanging portion 60 in the right-left direction is larger than the dimension of the opening and closing cover 40 in the right-left direction. As described above, the dimension of the overhanging portion 60 in the right-left direction may be configured to be different from the dimension of the opening and closing cover 40 in the right-left direction, including a case of being smaller.

In addition, although the boundary 69 between the overhanging portion 60 and the opening and closing cover 40 is formed in an arc shape in a case of being viewed in the axial direction of the shaft portion 45 (specifically, the up-down direction) as shown in FIG. 5 in the present exemplary embodiment, the invention is not limited thereto. For example, the boundary 69 between the overhanging portion 60 and the opening and closing cover 40 may be formed in a square shape in a case of being viewed in the axial direction of the shaft portion 45 (specifically, the up-down direction).

In addition, although the overhanging portion 50 overhangs to the opening and closing cover 40 side (specifically, the front side) outside the range of the imaginary circle 59 that is formed to have the gap S2 determined in advance with respect to the rotation trajectory 49 and that has a diameter larger than the diameter of the rotation trajectory 49 in the present exemplary embodiment, the invention is not limited thereto. For example, a configuration where the overhanging portion 50 is not formed at the cover 30 may be adopted.

In addition, although the overhanging portion 50 has the inclined surface 55 that is inclined with respect to the surface 36 (that is, the outer surface) of the cover 30 along the imaginary circle 59 in the present exemplary embodiment, the invention is not limited thereto. For example, the overhanging portion 50 may have the orthogonal surface orthogonal to the surface 36 of the cover 30. As this configuration, a configuration where the overhanging portion 50 overhangs in a stepped manner from the inner end portion 52 to the outer end portion 54 is conceivable.

In addition, although the outer surface 57 of the overhanging portion 50 is arranged on the identical surface with respect to the surface 36 of the cover 30 in the present exemplary embodiment, the invention is not limited thereto. For example, the overhanging portion 50 may be configured to overhang to the outside (that is, the left side) with respect to the surface 36 of the cover 30. In this case, the dimension of the overhanging portion 50 in the right-left direction is larger than the dimension of the cover 30 in the right-left direction. As described above, the dimension of the overhanging portion 50 in the right-left direction may be configured to be different from the dimension of the cover 30 in the right-left direction, including a case of being smaller.

In addition, although the overhanging portion 50 and the overhanging portion 60 are arranged at the positions facing the frame 92 arranged at the position visible through the gap S1 in the image forming apparatus body 11 in the present exemplary embodiment, the invention is not limited thereto. For example, one of the overhanging portion 50 or the overhanging portion 60 may be arranged at a position facing the frame 92. In addition, the overhanging portion 50 and the overhanging portion 60 may be configured to be arranged at positions shifted away with respect to the frame 92.

In addition, although the overhanging portion 50 and the overhanging portion 60 are arranged at the positions facing the transport member 14A arranged at the facing position facing the gap S1 in the image forming apparatus body 11 in the present exemplary embodiment, the invention is not limited thereto. For example, one of the overhanging portion 50 or the overhanging portion 60 may be arranged at a position facing the transport member 14A. In addition, the overhanging portion 50 and the overhanging portion 60 may be configured to be arranged at positions shifted away with respect to the transport member 14A.

In addition, although the frame 92 is an example of the component in the present exemplary embodiment, the invention is not limited thereto. As an example of the component, a transport component such as the transport member 14A, a drive component such as a motor, a hinge, and a cover different from the cover 30 and the opening and closing cover 40 may be used, or a component arranged at a position visible through the gap S1 may be used.

Second Exemplary Embodiment

Image Forming Apparatus 200

An image forming apparatus 200 according to the present exemplary embodiment will be described. The image forming apparatus 200 is an example of the device with a cover and includes an opening and closing cover 240, an overhanging portion 260, an overhanging portion 250, and an arm 247 instead of the opening and closing cover 40, the overhanging portion 60, the overhanging portion 50, and the frame 92 of the image forming apparatus 10. In this respect, the image forming apparatus 200 is different from the image forming apparatus 10 and is configured the same in other respects. Units configured identically to the first exemplary embodiment will be assigned with identical reference signs, and description thereof will be omitted as appropriate. Hereinafter, each unit of the image forming apparatus 200 will be described.

Opening and Closing Cover 240

Figure 8:
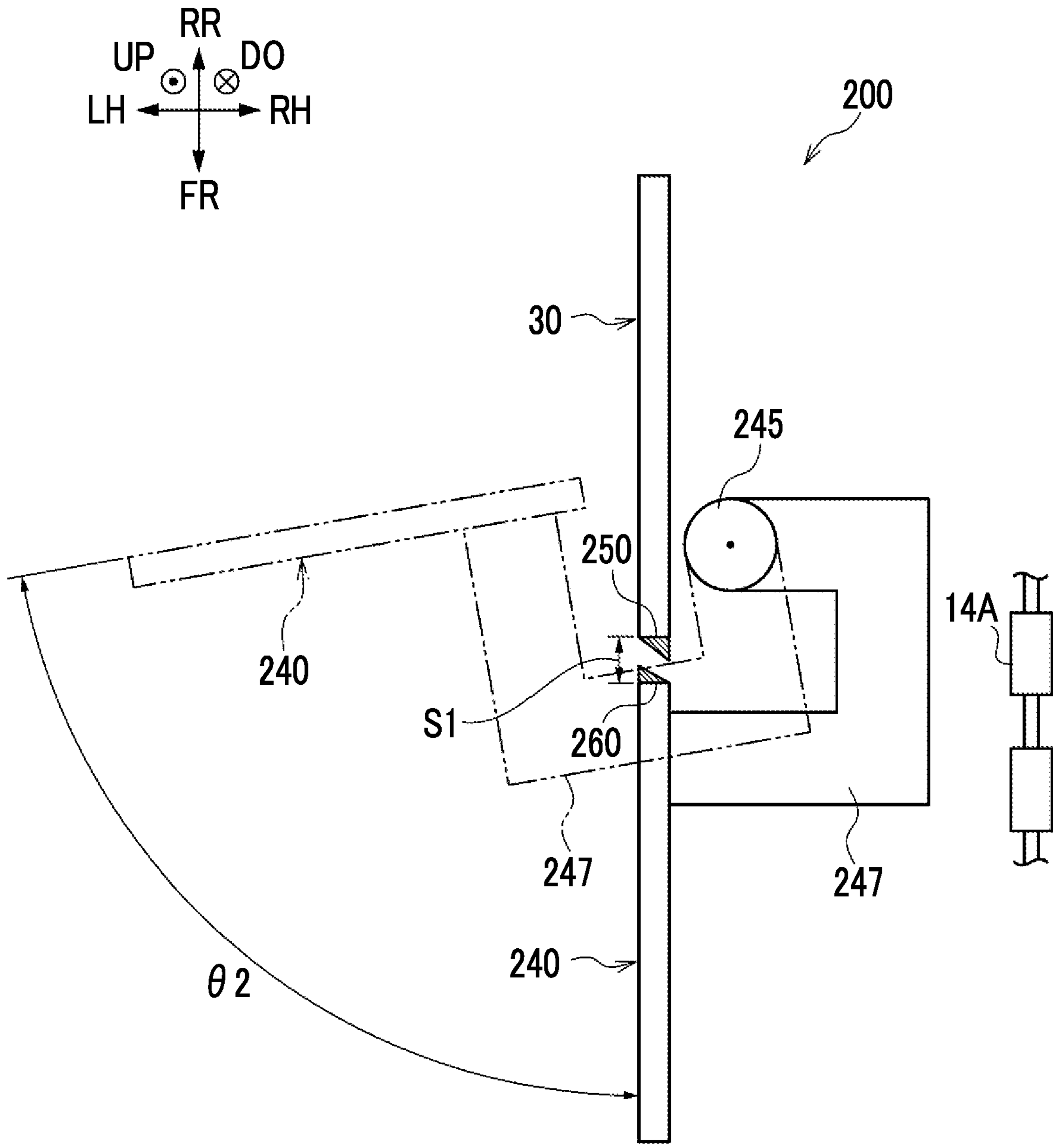
FIG. 8 is a plan cross-sectional view showing a cover, an opening and closing cover, and an overhanging portion according to a second exemplary embodiment.

As shown in FIG. 8, the opening and closing cover 240 is provided at the image forming apparatus body 11 (see FIG. 1) to be adjacent to the cover 30 in a state of having the gap S1 with the cover 30. Specifically, the opening and closing cover 240 is adjacent to the cover 30 on the front side of the cover 30.

The opening and closing cover 240 is opened and closed by rotating around a shaft portion 245 arranged on the inside with respect to the cover 30. Specifically, the opening and closing cover 240 rotates around the rotating shaft along the up-down direction between an open position (a position shown by a two-dot chain line in FIG. 8) and a closed position (a position shown by a solid line in FIG. 8) in a range of an angle θ2 shown in FIG. 8. The angle θ2 is larger than the angle ƒ1 in the first exemplary embodiment. That is, the opening and closing cover 240 has an opening angle larger than the opening angle of the opening and closing cover 40 of the first exemplary embodiment.

In addition, the opening and closing cover 240 is connected to the shaft portion 245 by the arm 247 formed in a U-shape in plan view. The arm 247 is an example of the component and is arranged at a position that is visible through the gap S1 in the image forming apparatus body 11. In other words, at least a part of the arm 247 directly faces the gap S1 without going through another member with the gap S1. Specifically, the arm 247 faces the gap S1 in the right-left direction (that is, a thickness direction of the cover 30 and the opening and closing cover 240). The arm 247 is formed of a material different from the material for the opening and closing cover 240 and the cover 30. Specifically, the arm 247 is configured by, for example, a metal material.

An inside with respect to the opening and closing cover 240 is an internal side of the image forming apparatus body 11 with respect to the opening and closing cover 240 and is the right side in the present exemplary embodiment. An outside with respect to the opening and closing cover 240 is an opposite side to the inside with respect to the opening and closing cover 240 and is the left side in the present exemplary embodiment.

The opening and closing cover 240 is configured by the same material (for example, a resin material) as the cover 30. As shown in FIG. 8, the opening and closing cover 240 is formed in a plate shape having the right-left direction as a thickness direction, like the cover 30. The opening and closing cover 240 and the cover 30 have, for example, the same thickness.

Overhanging Portion 260

Figure 9:
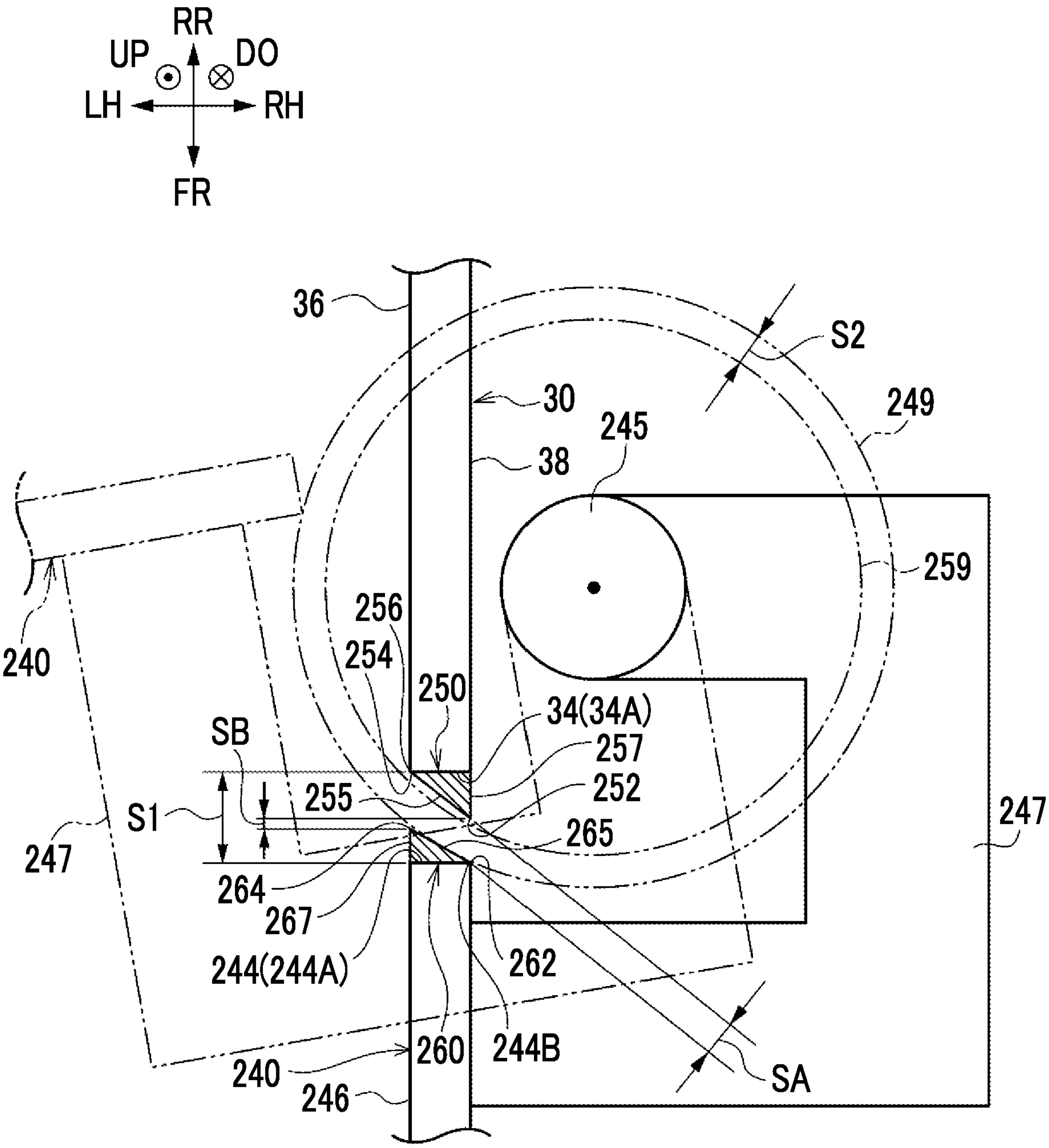
FIG. 9 is an enlarged plan cross-sectional view showing a part of the cover, the opening and closing cover, and the overhanging portion according to the second exemplary embodiment.

As shown in FIG. 9, the overhanging portion 260 is formed at an end portion (hereinafter, referred to as a rear end portion 244) of the opening and closing cover 240 on the cover 30 side (specifically, the rear side). The rear end portion 244 has an end surface 244A facing the cover 30 side (specifically, the rear side).

In the overhanging portion 260, an end portion 264 on the outside (hereinafter, referred to as the outer end portion 264) overhangs from an end portion 262 on the inside (hereinafter, referred to as the inner end portion 262) to the cover 30 side (specifically, the rear side) outside a range of a rotation trajectory 249 having the smallest radius formed at the rear end portion 244 with the shaft portion 245 as a rotation center.

The rotation trajectory 249 having the smallest radius is a rotation trajectory formed at an end 244B on the innermost side of the rear end portion 244 of the opening and closing cover 240. In addition, an inside with respect to the overhanging portion 260 is an internal side of the image forming apparatus body 11 with respect to the overhanging portion 260 and is the right side in the present exemplary embodiment. An outside with respect to the overhanging portion 260 is an opposite side to the inside with respect to the overhanging portion 260 and is the left side in the present exemplary embodiment.

In the present exemplary embodiment, the overhanging portion 260 is provided between the end surface 34A of the cover 30 and the end surface 244A of and the opening and closing cover 240 (that is, the gap S1) and is arranged at a position facing the arm 247 as shown in FIG. 8. Further, the overhanging portion 260 is arranged at a position facing the transport member 14A. Specifically, the overhanging portion 260 faces the arm 247 and the transport member 14A in the right-left direction (that is, the thickness direction of the cover 30 and the opening and closing cover 240).

As shown in FIG. 9, the overhanging portion 260 has an inclined surface 265 that is inclined with respect to a surface 246 (that is, an outer surface) of the opening and closing cover 240 along the rotation trajectory 249. The inclined surface 265 is a surface formed from the inner end portion 262 to the outer end portion 264 and is a surface facing an obliquely right rear side. The inclined surface 265 is also called an inclined surface along a tangent line tangent to a circle formed by the rotation trajectory 249.

In addition, the overhanging portion 260 has an outer surface 267 arranged on an identical surface to the surface 246 (that is, the outer surface) of the opening and closing cover 240. Further, the overhanging portion 260 is formed in a substantially triangular shape in plan cross-sectional view. Specifically, the overhanging portion 260 is formed in a substantially right-angled triangular shape having the inclined surface 265 as the hypotenuse and the outer surface 267 as the short side in plan cross-sectional view. The dimension of the overhanging portion 260 in the right-left direction is the same as the dimension of the opening and closing cover 240 in the right-left direction.

Overhanging Portion 250

As shown in FIG. 9, the overhanging portion 250 is formed at the end portion (hereinafter, referred to as the front end portion 34) of the cover 30 on an opening and closing cover 240 side (specifically, the front side). The front end portion 34 has the end surface 34A facing the opening and closing cover 240 side (specifically, the front side).

The overhanging portion 250 overhangs to the opening and closing cover 240 side (specifically, the front side) in a range of an imaginary circle 259 that is formed to have the gap S2 determined in advance with respect to the rotation trajectory 249 and that has a diameter smaller than the diameter of the rotation trajectory 249. Specifically, in the overhanging portion 250, an end portion 252 on the inside (hereinafter, referred to as the inner end portion 252) overhangs from an end portion 254 on the outside (hereinafter, referred to as the outer end portion 254) to the opening and closing cover 240 side (specifically, the front side).

An inside with respect to the overhanging portion 250 is an internal side of the image forming apparatus body 11 with respect to the overhanging portion 250 and is the right side in the present exemplary embodiment. An outside with respect to the overhanging portion 250 is an opposite side to the inside with respect to the overhanging portion 250 and is the left side in the present exemplary embodiment.

In the present exemplary embodiment, the overhanging portion 250 is provided between the end surface 34A of the cover 30 and the end surface 244A of and the opening and closing cover 240 (that is, the gap S1) and is arranged at a position facing the arm 247 as shown in FIG. 8. Further, the overhanging portion 250 is arranged at a position facing the transport member 14A.

As shown in FIG. 9, the overhanging portion 250 has an inclined surface 255 that is inclined with respect to the surface 36 (that is, the outer surface) of the cover 30 along the imaginary circle 259. The inclined surface 255 is a surface formed from the inner end portion 252 to the outer end portion 254 and is a surface facing an obliquely left front side. In addition, the inclined surface 255 faces the inclined surface 265. The inclined surface 255 is also called an inclined surface along a tangent line tangent to the imaginary circle 259.

In addition, the overhanging portion 250 has an inner surface 257 arranged on an identical surface to an inner surface 38 (that is, a surface on the inside) of the cover 30. Further, the overhanging portion 250 is formed in a substantially triangular shape in plan cross-sectional view. Specifically, the overhanging portion 250 is formed in a substantially right-angled triangular shape having the inclined surface 255 as the hypotenuse and the inner surface 257 as the short side in plan cross-sectional view. The dimension of the overhanging portion 250 in the right-left direction is the same as the dimension of the cover 30 in the right-left direction.

A boundary 256 between the overhanging portion 250 and the cover 30 is formed in an arc shape in a case of being viewed in an axial direction of the shaft portion 245 (specifically, the up-down direction). That is, the boundary 256 is formed by a curved surface that does not have a corner (edge).

Workings According to Present Exemplary Embodiment

In the present exemplary embodiment, as shown in FIG. 9, in the overhanging portion 260, the outer end portion 264 overhangs from the inner end portion to the cover 30 side (specifically, the rear side) outside the range of the rotation trajectory 249 having the smallest radius formed at the rear end portion 244 with the shaft portion 245 as the rotation center.

Figure 10:
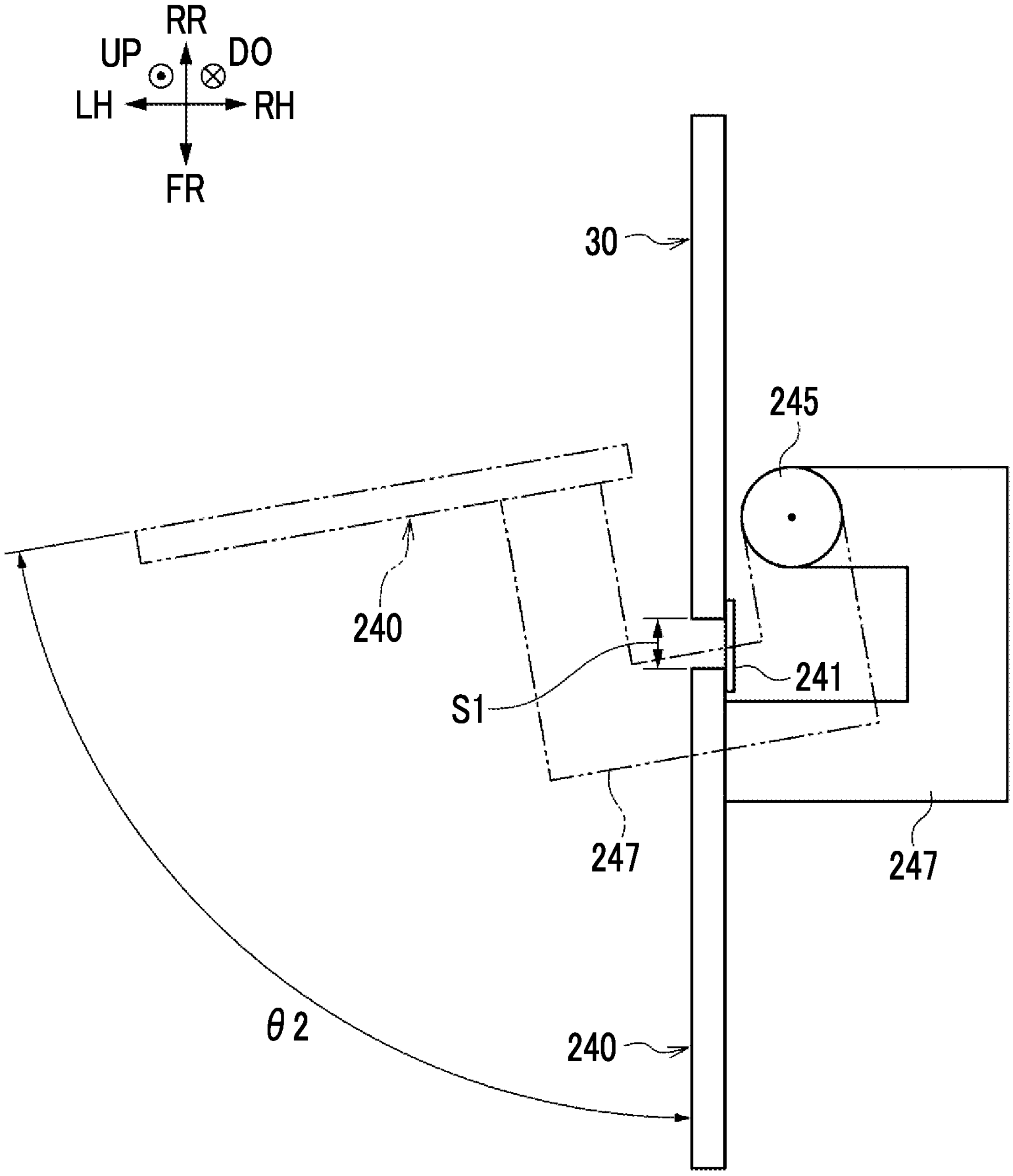
FIG. 10 is a plan cross-sectional view showing a cover and an opening and closing cover according to still another comparative embodiment.

Herein, as shown in FIG. 10, in a case where the gap S1 between the opening and closing cover 240 and the cover 30 is decreased by adding a component 241 (hereinafter, referred to as a form E), the number of components increases, leading to an increase in costs.

On the contrary, in the present exemplary embodiment, as described above, in the overhanging portion 260, the end portion 264 on the outside overhangs from the inner end portion 262 to the cover 30 side (specifically, the rear side) outside the range of the rotation trajectory 249.

Specifically, as shown in FIG. 9, in the present exemplary embodiment, the gap SA between the overhanging portion 260 and the overhanging portion 250 in a direction perpendicular to the inclined surface 255 is smaller than the gap S1, and the gap SB between the overhanging portion 260 and the overhanging portion 250 along the front-rear direction is further smaller than the gap SA.

In addition, in the present exemplary embodiment, the overhanging portion 260 has the inclined surface 265 that is inclined with respect to the surface 246 (that is, the outer surface) of the opening and closing cover 240 along the rotation trajectory 249 as shown in FIG. 9.

In addition, in the present exemplary embodiment, the overhanging portion 250 overhangs to the opening and closing cover 240 side (specifically, the front side) in the range of the imaginary circle 259 that is formed to have the gap S2 determined in advance with respect to the rotation trajectory 249 and that has a diameter smaller than the diameter of the rotation trajectory 249.

In addition, in the present exemplary embodiment, the overhanging portion 250 has the inclined surface 255 that is inclined with respect to the surface 36 (that is, the outer surface) of the cover 30 along the imaginary circle 259 as shown in FIG. 9.

In the present exemplary embodiment, the overhanging portion 250 and the overhanging portion 260 are arranged at positions facing the arm 247 arranged at a position visible through the gap S1 in the image forming apparatus body 11.

Herein, in a case where the overhanging portion 250 and the overhanging portion 260 are arranged at positions shifted away with respect to the arm 247 (hereinafter, referred to as a form F), the arm 247 is likely to be visible through the gap S1. In particular, since the arm 247 is formed of a material for the opening and closing cover 240 and the cover 30, contrast is generated, and the arm 247 is likely to be noticeable.

On the contrary, in the present exemplary embodiment, as described above, the overhanging portion 250 and the overhanging portion 260 are arranged at the positions facing the arm 247.

In addition, in the present exemplary embodiment, the overhanging portion 250 and the overhanging portion 260 are arranged at positions facing the transport member 14A arranged at the facing position facing the gap S1 in the image forming apparatus body 11.

Herein, in a case where the overhanging portion 250 and the overhanging portion 260 are arranged at positions shifted away with respect to the transport member 14A (hereinafter, referred to as a form G), noise generated by transporting the recording medium P with the transport member 14A is likely to leak from the gap S1.

On the contrary, in the present exemplary embodiment, as described above, the overhanging portion 250 and the overhanging portion 260 are arranged at the positions facing the transport member 14A.

In addition to noise generated by transporting the recording medium P with the transport member 14A as the noise, a sound source that generates sound, such as a motor, a fan, a solenoid, and an electromagnetic clutch, is a cause of noise. Therefore, in a case where the sound source is arranged at a facing position facing the gap S1 in the image forming apparatus body 11, for example, it is desirable that the overhanging portion 250 and the overhanging portion 260 are arranged at positions facing the sound source.

In addition, in the present exemplary embodiment, the boundary 256 between the overhanging portion 250 and the cover 30 is formed in an arc shape in a case of being viewed in the axial direction of the shaft portion 245 (specifically, the up-down direction).

Modification Example of Present Exemplary Embodiment

Although the opening and closing cover 240 rotates around the rotating shaft along the up-down direction in the present exemplary embodiment, the invention is not limited thereto. For example, the opening and closing cover 240 may be configured to rotate around a rotating shaft along the front-rear direction or the right-left direction.

In addition, although the overhanging portion 250 and the overhanging portion 260 are formed in a substantially right-angled triangular shape in plan cross-sectional view in the present exemplary embodiment, the invention is not limited thereto. For example, the overhanging portion 250 and the overhanging portion 260 may have a triangular shape other than a right-angled triangular shape, such as a substantially isosceles triangle, and a polygonal shape other than a triangular shape, such as a quadrangular shape (for example, a trapezoidal shape), in plan cross-sectional view, and can be formed in various shapes.

In addition, although the overhanging portion 260 has the inclined surface 265 that is inclined with respect to the surface 246 (that is, the outer surface) of the opening and closing cover 240 along the rotation trajectory 249 as shown in FIG. 9 in the present exemplary embodiment, the invention is not limited thereto. For example, the overhanging portion 260 may have the orthogonal surface orthogonal to the surface 246 of the opening and closing cover 240. As this configuration, a configuration where the overhanging portion 260 overhangs in a stepped manner from the inner end portion 262 to the outer end portion 264 is conceivable.

In addition, although the outer surface 267 of the overhanging portion 260 is arranged on an identical surface with respect to the surface 246 of the opening and closing cover 240 in the present exemplary embodiment, the invention is not limited thereto. For example, the overhanging portion 260 may be configured to overhang to the outside (that is, the left side) with respect to the surface 246 of the opening and closing cover 240. In this case, the dimension of the overhanging portion 260 in the right-left direction is larger than the dimension of the opening and closing cover 240 in the right-left direction. As described above, the dimension of the overhanging portion 260 in the right-left direction may be configured to be different from the dimension of the opening and closing cover 240 in the right-left direction, including a case of being smaller.

In addition, although the overhanging portion 250 overhangs to the opening and closing cover 240 side (specifically, the front side) in the range of the imaginary circle 259 that is formed to have the gap S2 determined in advance with respect to the rotation trajectory 249 and that has a diameter smaller than the diameter of the rotation trajectory 249 in the present exemplary embodiment, the invention is not limited thereto. For example, a configuration where the overhanging portion 250 is not formed at the cover 30 may be adopted.

In addition, although the overhanging portion 250 has the inclined surface 255 that is inclined with respect to the surface 36 (that is, the outer surface) of the cover 30 along the imaginary circle 259 as shown in FIG. 9 in the present exemplary embodiment, the invention is not limited thereto. For example, the overhanging portion 250 may have the orthogonal surface orthogonal to the surface 36 of the cover 30. As this configuration, a configuration where the overhanging portion 250 overhangs in a stepped manner from the outer end portion 254 to the inner end portion 252 is conceivable.

In addition, although the inner surface 257 of the overhanging portion 250 is arranged on the identical surface with respect to the inner surface 38 of the cover 30 in the present exemplary embodiment, the invention is not limited thereto. For example, the overhanging portion 250 may be configured to overhang to the inside (that is, the right side) with respect to the inner surface 38 of the cover 30. In this case, the dimension of the overhanging portion 250 in the right-left direction is larger than the dimension of the cover 30 in the right-left direction. As described above, the dimension of the overhanging portion 250 in the right-left direction may be configured to be different from the dimension of the cover 30 in the right-left direction, including a case of being smaller.

In addition, although the overhanging portion 250 and the overhanging portion 260 are arranged at the positions facing the arm 247 arranged at the position visible through the gap S1 in the image forming apparatus body 11 in the present exemplary embodiment, the invention is not limited thereto. For example, one of the overhanging portion 250 or the overhanging portion 260 may be arranged at a position facing the arm 247. The overhanging portion 250 and the overhanging portion 260 are arranged at positions shifted away with respect to the arm 247.

In addition, although the overhanging portion 250 and the overhanging portion 260 are arranged at the positions facing the transport member 14A arranged at the facing position facing the gap S1 in the image forming apparatus body 11 in the present exemplary embodiment, the invention is not limited thereto. For example, one of the overhanging portion 250 or the overhanging portion 260 may be arranged at a position facing the transport member 14A. In addition, the overhanging portion 250 and the overhanging portion 260 may be arranged at positions shifted away with respect to the transport member 14A.

In addition, although the boundary 256 between the overhanging portion 250 and the cover 30 is formed in an arc shape in a case of being viewed in the axial direction of the shaft portion 245 (specifically, the up-down direction) in the present exemplary embodiment, the invention is not limited thereto. For example, the boundary 256 between the overhanging portion 250 and the cover 30 may be formed in a square shape in a case of being viewed in the axial direction of the shaft portion 245 (specifically, the up-down direction).

In addition, although the arm 247 is an example of the component in the present exemplary embodiment, the invention is not limited thereto. As an example of the component, a transport component such as the transport member 14A, a drive component such as a motor, a hinge, and a cover different from the cover 30 and the opening and closing cover 240 may be used, or a component arranged at a position visible through the gap S1 may be used.

Modification Example of Image Forming Apparatuses 10 and 200

Examples of the device with a cover are not limited to the image forming apparatuses 10 and 200 described above. As an example of the device with a cover, a transport device that transports a material to be transported, an image reading device that reads an image on a medium, a preprocessing device that performs various types of processing on a recording medium before an image is formed, and a post-processing device that performs various types of processing (for example, bookbinding, binding, and folding) on a recording medium on which an image is formed may be used, or a device having a cover may be used.

Modification Example of Image Forming Unit 12

An example of the image forming unit is not limited to the image forming unit 12 described above. As an example of the image forming unit, each of the toner image forming units 20Y to 20K may use a direct transfer method in which a toner image is directly formed on the recording medium P without going through the transfer body 24. In addition, as an example of the image forming unit, an image forming unit that forms an image by jetting an ink to the recording medium P may be used, or and a unit that has a function of forming an image on the recording medium P may be used.

The present invention is not limited to the exemplary embodiments, and various modifications, changes, and improvements can be made without departing from the gist thereof. For example, the plurality of modification examples described above may be configured in combination as appropriate.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A device with a cover comprising:

a cover that is provided at an apparatus body;

an opening and closing cover that is provided at the apparatus body to be adjacent to the cover in a state where a gap with the cover is provided, wherein the opening and closing cover is opened and closed by rotating around a shaft portion arranged on an inside with respect to a portion of the opening and closing cover on a cover side, and the opening and closing cover is adjacent to the cover on a shaft portion side;

an overhanging portion that is formed at an end portion of the opening and closing cover on the cover side and in which an end portion on the inside overhangs further toward the cover side than an end portion on an outside in a range of a rotation trajectory having a largest radius formed at the end portion on the cover side with the shaft portion as a rotation center; and another overhanging portion that is formed at an end portion of the cover on an opening and closing cover side and overhangs to the opening and closing cover side outside a range of an imaginary circle which is formed to have a gap determined in advance with respect to the rotation trajectory and which has a diameter larger than the rotation trajectory.

2. The device with a cover according to claim 1, wherein the overhanging portion has an inclined surface that is inclined with respect to a surface of the opening and closing cover along the rotation trajectory.

3. The device with a cover according to claim 2, wherein a boundary between the overhanging portion and the opening and closing cover is formed in an arc shape in a case of being viewed in an axial direction of the shaft portion.

4. The device with a cover according to claim 3, wherein the another overhanging portion formed at the cover has an inclined surface inclined with respect to a surface of the cover along the imaginary circle.

5. The device with a cover according to claim 2, wherein the another overhanging portion formed at the cover has an inclined surface inclined with respect to a surface of the cover along the imaginary circle.

6. The device with a cover according to claim 1, wherein the another overhanging portion formed at the cover has an inclined surface inclined with respect to a surface of the cover along the imaginary circle.

7. The device with a cover according to claim 1, further comprising:

a component that is formed of a material different from a material for the opening and closing cover and the cover and is arranged at a position visible through the gap in the apparatus body, wherein the overhanging portion is arranged at a position facing the component.

8. An image forming apparatus as the device with a cover according to claim 1, comprising:

a transport member that is arranged at a position facing the gap and transports a medium; and an image forming unit that forms an image on the medium transported by the transport member, wherein the overhanging portion is arranged at a position facing the transport member.

9. A device with a cover comprising:

a cover that is provided at an apparatus body;

an opening and closing cover that is provided at the apparatus body to be adjacent to the cover in a state where a gap with the cover is provided and that is opened and closed by rotating around a shaft portion arranged on an inside with respect to the cover;

an overhanging portion that is formed at an end portion of the opening and closing cover on a cover side and in which an end portion on an outside overhangs further toward the cover side than an end portion on the inside outside a range of a rotation trajectory having a smallest radius formed at the end portion on the cover side with the shaft portion as a rotation center; and another overhanging portion that is formed at an end portion of the cover on an opening and closing cover side and overhangs to the opening and closing cover side in a range of an imaginary circle which is formed to have a gap determined in advance with respect to the rotation trajectory and which has a diameter smaller than the rotation trajectory.

10. The device with a cover according to claim 9, wherein the overhanging portion has an inclined surface that is inclined with respect to a surface of the opening and closing cover along the rotation trajectory.

11. The device with a cover according to claim 10, wherein the another overhanging portion formed at the cover has an inclined surface inclined with respect to a surface of the cover along the imaginary circle.

12. The device with a cover according to claim 10, wherein a boundary between the another overhanging portion formed at the cover and the cover is formed in an arc shape in a case of being viewed in an axial direction of the shaft portion.

13. The device with a cover according to claim 9, wherein the another overhanging portion formed at the cover has an inclined surface inclined with respect to a surface of the cover along the imaginary circle.

14. The device with a cover according to claim 9, wherein a boundary between the another overhanging portion formed at the cover and the cover is formed in an arc shape in a case of being viewed in an axial direction of the shaft portion.

15. The device with a cover according to claim 13, wherein a boundary between the another overhanging portion formed at the cover and the cover is formed in an arc shape in a case of being viewed in an axial direction of the shaft portion.

* * * * *